United States Patent [19]

Whiteside

[11] Patent Number: 4,968,773
[45] Date of Patent: * Nov. 6, 1990

[54] PROCESS FOR THE PREPARATION OF UREA-FORMALDEHYDE RESINS

[75] Inventor: Ian R. Whiteside, Linton, England

[73] Assignee: Dyno Industrier AS, Oslo, Norway

[*] Notice: The portion of the term of this patent subsequent to May 8, 2090 has been disclaimed.

[21] Appl. No.: 208,525

[22] Filed: Jun. 20, 1988

[30] Foreign Application Priority Data

Jun. 30, 1987 [GB] United Kingdom ............... 8715305

[51] Int. Cl.$^5$ ............................................. C08G 12/12
[52] U.S. Cl. .................................... 528/230; 528/232; 528/239; 528/242; 528/259; 525/399; 525/593; 525/597; 525/843
[58] Field of Search ............... 528/230, 232, 239, 242, 528/259; 525/399, 593, 597, 843

[56] References Cited

U.S. PATENT DOCUMENTS

| | | | |
|---|---|---|---|
| 3,962,166 | 6/1976 | Gordon | 524/843 |
| 4,032,515 | 6/1977 | Blommers et al. | 528/155 |
| 4,174,310 | 11/1979 | Hubbard | 523/340 |
| 4,247,433 | 1/1981 | Schamberg et al. | 524/843 |
| 4,381,368 | 4/1983 | Spurlock | 524/598 |
| 4,410,685 | 10/1983 | Williams | 528/259 |

FOREIGN PATENT DOCUMENTS

| | | |
|---|---|---|
| 1376385 | 12/1974 | United Kingdom . |
| 1376388 | 12/1974 | United Kingdom . |
| 1420017 | 1/1976 | United Kingdom . |
| 1480787 | 7/1977 | United Kingdom . |
| 1486342 | 9/1977 | United Kingdom . |

*Primary Examiner*—John Kight, III
*Assistant Examiner*—Sam A. Acquah
*Attorney, Agent, or Firm*—Wenderoth, Lind & Ponack

[57] ABSTRACT

Urea-formaldehyde resins which may be cured to give products having a low total extractable formaldehyde content are prepared by the following process:

(i) an aqueous solution containing more than 50% formaldehyde and urea are mixed in a formaldehyde:urea molar ratio of 2–3:1 at pH 6–11,
(ii) this mixture is heated to at least 80° C.,
(iii) a mineral or organic acid is added to bring the mixture to pH 0.5–3.5,
(iv) the mixture is heated at a temperature between 80° C. and the reflux temperature, preferably for 15 minutes to 1 hour,
(v) keeping the temperature at or above 80° C., a base is added to bring the mixture to pH 6.5–9 and
(vi) urea is added to the mixture at a temperature up to 45° C. until the formaldehyde:urea molar ratio is within the range 0.8–1.8:1.

20 Claims, No Drawings

PROCESS FOR THE PREPARATION OF UREA-FORMALDEHYDE RESINS

This invention relates to a process for the preparation of urea-formaldeyde resins and to the use of the resins so prepared in binders for lignocellulosic materials.

Urea-formaldehyde resins are widely used in industry as binders for the production of bonded wood products, particularly particle board, plywood, and various fibreboards. They are usually employed as colloidal aqueous solutions having a 60–70% solids content, the solids content being the percentage weight left when a 2 g sample of the resin is heated at atmospheric pressure at 120° C. for 3 hours.

The resins themselves are complex mixtures of various condensation products, ranging from simple methylolated ureas to fairly high molecular weight materials, and the precise properties of any particular resin will depend upon its F:U molar ratio (i.e. the ratio of formaldehyde to urea when used in its manufacture), the type and proportion of the various linkages within the resin structure, and the proportions of high and low molecular weight material. These last two factors are dependent upon the precise manufacturing method that is used.

Conventional commercial resins all liberate a certain amount of formaldehyde during hot curing and after cure has taken place. The latter liberation of formaldehyde can be a serious problem since it limits the use to which, for example, particle boards or fibreboards may be put. A board that liberates formaldehyde above a specified level cannot be used in unventilated areas. The measurement of the total extractable formaldehyde is therefore an important test that is carried out on particle and fibreboard samples, and is usually effected using the method of the Federation Europeene des Syndicates des Fabricants des Panneaux de Particules (FESYP) and described in British Standard 1811. In this test small rectangular blocks sawn from air-dried particle board or fibreboard are extrated with toluene, the toluene is washed with water, and the water measured iodometrically for formaldehyde. A need exists for resins that have a very low content of extractable formaldehyde but which, in all their performance properties, behave like a conventional urea-formaldehyde resin.

The conventional method of manufacturing urea-formaldehyde resins comprises precondensing urea with formaldehyde in aqueous solution under reflux at pH 7–9, and heating the mixture at pH 5–6 until the desired degree of water insolubility or viscosity is reached. The product is neutralised and may then be evaporated and blended with a further quantity of urea if desired. Such conventional resins usually have a F:U molar ratio within the range 1.3 to 2.3:1.

Resins having a F:U molar ratio as low as 1:1 have been described in British Patent Specification No. 1 420 017. These resins are said to be suitable for binding wood-based materials and are prepared by (i) condensing formaldehyde and urea at a F:U molar ratio of at least 3:1 and at pH 3 or less, (ii) adding urea to bring the molar ratio down to 2–2.75:1, and continuing to heat at pH 3 or less (iii) optionally, adding more urea so that the final molar ratio is within the range 1–2.75:1, (iv) adjusting the pH to 5–6.5 or to 8–10, and continuing the heating until the desired product is formed. This product may then be concentrated or dried, if desired.

A serious drawback with this process is that, on an industrial scale, it is difficult to obtain a consistent product and there is a serious risk of the product forming an intractable gel during the process, such formation then requiring dismantling of the apparatus in order for it to be cleaned. Further, when the product has been made successfully, it has poor 'wash down' properties. This means that pipework, pumps etc. through which the resin has been passed are difficult to clean, due to the inherent stickiness of the resin.

Another process for preparing adhesive resins with low formaldehyde content is described in U.S. Pat. No. 4,410,685. In this process resins having a F:U molar ratio within the range 1.0 to 1.2:1 are prepared as follows:

(i) formaldehyde solution is acidified to pH 0.5–2.5, (ii) the acid solution is heated to 50°–70° C., (iii) urea is added slowly until the F:U molar ratio reaches 2.9 to 3.1:1

(iv) when the mixture reaches a given viscosity it is neutralised, and (v) urea is added to give a F:U molar ratio of 1.0 to 1.2:1.

Like the previous process described, this process is difficult to control, especially on an industrial scale, and unless careful control is maintained over the reaction the resin will gel during the condensation stage if the conditions that are described are strictly followed.

It has now been found that urea-formaldehyde resins having a low content of total extractable formaldehyde and which are suitable for bonding wood-based products, such as fibreboard or particle board, may be prepared with a minimal risk of forming intractable gels if the urea is first methylolated under alkaline conditions at elevated temperature and in a F:U molar ratio within the range 2:1 to 3:1, this mixture is then acidified to a low pH and condensation allowed to continue at elevated temperature. The mixture is neutralised and urea is added to adjust the F:U molar ratio to within the range 1.8 or less: 1. This process facilitates formation of a resin which is water soluble and which, when freshly prepared, is completely transparent in apperance. This transparency is lost gradually on storing, the resin becoming slowly opalescent, so that examination of the trubidity of the resin gives an immediate indication of its age or storage conditions.

It would have been expected that the use of concentrated formalin as the source of formaldehyde in such a process would lead to an uncontrollable reaction at the low pH, giving a product having too high a viscosity and having low residual reactivity. However, it has surprisingly been found that formalin containing more than 50% by weight of formaldehyde can be used successfully to give a product having good reactivity and having a solids content such that it does not have to be evaporated to be useful as a binder for lignocellulosic materials in products such as fibreboard and particle board.

Accordingly, this invention provides a process for the preparation of urea-formaldehyde resins which comprises (i) mixing an aqueous formaldehyde solution containing more than 50% by weight of formaldehyde with urea at a formaldehyde: urea molar ratio of 2.0 to 3.0:1 and at pH 6–11, (ii) heating the mixture to at least 80° C., (iii) adding an acid until the mixture reaches a pH within the range 0.5–3.5, (iv) heating the mixture at a temperature between 80° C. and the reflux temperature, (v) with the mixture at a temperature of at least 80° C., adding a base until the mixture reaches a pH within the range 6.5–9, and (vi) adding urea to the mixture at a temperature up to 45° C. until the formaldehyde:urea molar ratio is within the range 0.8–1.8:1.

For use as a binder for particle boards or fibreboards, the urea-formaldehyde resin should have a solids content of 40 to 75%. If it is necessary to evaporate the mixture in order to achieve a desired solids content, the evaporation may be carried out, under reduced pressure, either between stages (v) and (vi) or after stage (vi). For most applications, however, a resin produced by the process of this invention does not need to be evaporated.

The initial mixing of formaldehyde solution, generally containing 51–60%, preferably 51–55%, by weight of formaldehyde, and urea usually takes place at a F:U molar ratio within the range 2.2 to 2.8:1, especially 2.3 to 2.5:1, and at pH 8–9. This mixture is then heated to at least 80° C., and preferably to reflux, the elevated temperature then usually being maintained for 5 to 30 minutes, preferably 10 to 20 minutes. An acid is then added to bring the pH of the mixture to 3.5 or below, preferably 1 to 3, especially 2 to 3. The acid is preferably added while maintaining gentle reflux to keep the exothermic reaction under control. The type of acid used is not critical—inorganic or organic acids have both been found to be suitable. Typical acids that may be used include trichloroacetic, toluene-p-sulphonic, hydrochloric, sulphuric, sulphamic and phosphoric acids.

Heating of the acid mixture in step (iv) is usually effected under reflux, and for a period of from 1 minute to 2 hours, especially from 15 minutes to 1 hour. The temperature of the reaction mixture may be allowed to fall slightly, but this increases the risk of intractable gel formation, particularly when a formaldehyde:urea molar ratio up to 2.6:1 is used. In general, the temperature below which the reaction mixture should not be allowed to fall depends on the formaldehyde:urea molar ratio employed, lower ratios requiring higher temperatures to be maintained. When the formaldehyde:urea molar ratio is up to 2.6:1, the reaction mixture is preferably maintained under reflux until the acid condensation stage (iv) has been terminated by the addition of the base in step (v). Heating of the reaction mixture in steps (ii), (iv) and (v) may be carried out under pressure, in which case the reflux temperature is, of course, higher and the respective heating time can generally be reduced.

For reasons of economy, the base which is used in step (v) is usually sodium hydroxide or potassium hydroxide, but any base that will raise the pH of the mixture to within the range 6.5 to 9 is satisfactory.

When the desired pH has been reached, the mixture is cooled to a temperature of 45° C. or below, preferably to within the range 25°–45° C., before urea is added in step (vi). Addition of urea gives the desired F:U molar ratio, preferably from 1.0 to 1.7:1, especially 1.2 to 1.5:1. After adding the urea, the mixture is usually stirred for 30 to 90 minutes.

Resins made by this new process have their formaldehyde firmly bonded into the molecule, so that both the uncured and cured resins give low values for available formaldehyde. This may be shown by measuring the free formaldehyde from the uncured resin, the liberated formaldehyde from the hot curing of fibreboard or particle board, and the total extractable formaldehyde from cured fibreboard or particle board.

By means of the process of the present invention, resins having remarkably good washdown properties can be prepared, so that apparatus which has been used for the uncured resin may be cleaned easily with a jet of hot water, as can any spillages. This is an important consideration in an industry where large quantities of resin are handled and, if the resin residues are allowed to remain and harden, an expensive strip-down of equipment is needed for cleaning.

The present invention also facilitates the production of resins having remarkable clarity when freshly prepared. Resins having F:U molar ratios of 1.8 or less have always been opalescent, or more usually thick white liquids. To make such resins as clear, transparent liquids allows an instant visible means of checking that the resin made by this process has been supplied and that contamination by other materials has not taken place.

These advantages can be achieved with no loss of strength in the resin. Products made using this resin, such as fibreboard and particleboard, generally have the strength which could be expected from products made with a conventional resin having the same solids content and F:U molar ratio.

Resins made by the process of this invention are particularly useful in the production of products known as medium density fibreboards, facilitating good processability and high production rates and showing good resistance to premature cure in blending operations.

These resins may be hardened by any conventional means, usually by heating or by the addition of an acid hardener which cures the resins at ambient temperatures, such as formic, phosphoric, or hydrochloric acid, or using a heat-activated hardener such as an acid salt that liberates an acid when heated, preferably ammonium chloride. Accordingly, the invention also provides a cured urea-formaldehyde resin obtained by hardening a resin prepared by the process of the invention.

The present invention also provides bonded lignocellulosic material, especially fibreboard or particle board, comprising as binder a cured urea-formaldehyde resin of the invention. The invention further provides a process for bonding two lignocellulosic surfaces together which comprises applying to at least one of the surfaces a urea-formaldehyde resin prepared by the process of the invention, and holding the surfaces together while curing the resin. In a particular embodiment of this process, fibreboard or particle board is produced by mixing lignocellulosic fibres or particles, preferably of wood, together with a binder comprising a urea-formaldehyde resin prepared by the process of the invention and, optionally, a heat-activated hardener therefor and heating the resulting mixture under pressure until the binder is cured. The optional heat-activated hardener can be any conventional heat-activated hardener for urea-formaldehyde resins, such as an acid salt which liberates an acid on heating, preferably ammonium chloride. In general, no hardener is used in the production of fibreboard, while the hardener is used in the manufacture of particle board. The fibreboard or particleboard can formed in a conventional press, using conventional curing conditions. Conventional additives, such as a wax emulsion to improve moisture resistance of the product, can be included in the mixture of lignocellulosic material and binder.

The process of the invention as hereinbefore defined may be modified to produce resins in a solid particulate form. After step (v), instead of adding urea to give a resin having a formaldehyde:urea molar ratio of 0.8:1 to 1.8:1, the mixture from step (v), preferably after dilution with water to a solids content of 40 to 55%, is reacted with urea under acid conditions to give a higher molecular weight resin which is then neutralised and dehydrated to give a solid, particulate resin.

Accordingly, the invention also provides a modification of the process as hereinbefore described which comprises (a) carrying out steps (i) to (v) as hereinbefore described, (b) reacting the mixture from step (v) with urea at a pH below 7 to increase the viscosity thereof, (c) adding a base until the mixture reaches a pH within the range 6.5–9, and (d) dehydrating the mixture to form a solid particulate resin.

The reaction of the mixture from step (v) with urea is usually carried out at a pH of 3 to 5 and a temperature of 30° to 60° C., using urea in an amount sufficient to give the reaction mixture a formaldehyde:urea molar ratio of from 1.3:1 to 1.9:1, until the viscosity of the reaction mixture is 2 to 4 times the initial viscosity of the mixture. Preferably this reaction is carried out at a pH of 3.5 to 4.5 and a temperature of 35° to 50° C., using urea in an amount sufficient to give the reaction mixture a formaldehyde:urea molar ratio of 1.5:1 to 1.7:1, until the viscosity of the reaction mixture is 2.5 to 3.5 times the initial viscosity of the mixture. Preferably also, the mixture from step (v) is diluted with water to a solids content of 40-55%, preferably 45-55%, by weight, before the reaction with urea.

Acids suitable for use in reducing the pH of the mixture from step (v) include those hereinbefore mentioned as suitable for use in step (iii). Any base that will raise the pH of the mixture to within the range 6.5 to 9 can be used in step (c); for reasons of economy, sodium hydrxide and potassium hydroxide are preferred.

The dehydration step (d) can be carried out in a conventional spray drier to form the particulate resin. By means of the process of the invention, particulate resins having low values for available formaldehyde, both in the uncured and cured state, can be obtained, these resins having excellent tack properties and being particularly suitable for use in binders for particle boards, wafer board and plywood.

For use as a binder, the particulate resin may be mixed with a solid hardener therefor and optionally with additives, e.g. fillers such as wood flour and china clay, to give a storage-stable composition known as a "one-shot" composition which can be activated by the addition of water. Suitable solid hardeners for use in such "one-shot" compositions are well-known; aluminium sulphate is the most generally used material. Alternatively, the particulate resin may be dissolved or dispersed in water to reform, in effect, a liquid resin which can be mixed with a hardener therefor and optionally with additives for use as a binder. Conventional hardeners, such as the acid and salt hardeners hereinbefore mentioned, can be used.

The invention is illustrated by reference to the following Examples in which all parts and percentages are by weight unless otherwise indicated. "w/v" indicates weight by volume. The solids contents are determined by heating a 2 g sample at 120° C. for 3 hours under atmospheric pressure.

EXAMPLE 1

Aqueous formaldehyde solution (542.1 g; 51% HCHO) is treated with sodium hydroxide solution (2 ml; 10% w/v NaOH), and urea (230.3 g). The mixture, which is of pH 9 and has a F:U molar ratio of 2.40:1, is stirred and heated to reflux temperature, where it is maintained for 15 minutes. An aqueous solution of sulphuric acid (5 ml; 15% $H_2SO_4$) is added. The resulting mixture, which is of pH 2.7 is heated under reflux, for 30 minutes.

Whilst maintaining the reflux, aqueous sodium hydroxide solution (9 ml; 10% w/v NaOH) is added to give a neutral solution (pH 7). This is allowed to cool to 40° C., urea (211.8 g) is added, giving a F:U molar ratio of 1.25:1, and the mixture is stirred for 60 minutes.

The resulting resin is a water-soluble, colourless transparent liquid having the following properties:
Solids content: 60%
Viscosity at 25° C.: 0.15 Pa s
Free formaldehyde: less than 0.3%.

EXAMPLE 2

Aqueous formaldehyde solution (531.9 g; 55% HCHO) is mixed with aqueous sodium hydroxide solution (10% w/v NaOH) and urea (234.1 g) to give a mixture having a pH of 8. The mixture, which has a F:U molar ratio of 2.5:1, is stirred and heated to reflux temperature, where it is maintained for 15 minutes. An aqueous solution of sulphuric acid (15% $H_2SO_4$) is added to reduce the pH to 2.5. The acidified solution is heated under reflux for 25 minutes.

Whilst maintaining the reflux, aqueous sodium hydroxide solution (10% w/v NaOH) is added to give a solution of pH 7.5. This is allowed to cool to 40° C., urea (156 g) is added, giving a F:U molar ratio of 1.5:1, and the mixture is stirred for 30 minutes.

The resulting resin is a water-soluble, colourless transparent liquid having a solids content of 58% which is suitable for use in the production of fibreboard and particle board.

EXAMPLE 3

Aqueous formaldehyde solution (510.2 g; 60% HCHO) is mixed with aqueous sodium hydroxide solution (10% w/v NaOH) and urea (244.9 g), the amount of sodium hydroxide solution being sufficient to give a mixture of pH 9. The mixture, which has a F:U molar ratio of 2.5:1, is stirred and heated to reflux temperature, where it is maintained for 15 minutes. An aqueous solution of sulphuric acid (15% $H_2SO_4$) is added to reduce the pH to 2.7. The acidified mixture is heated under reflux for 20 minutes.

Whilst maintaining the reflux, aqueous sodium hydroxide solution (10% w/v NaOH) is added to give a solution of pH 8. This is allowed to cool to 40° C., urea (226 g) is added, giving a F:U molar ratio of 1.3:1, and the mixture is stirred for 45 minutes.

The resulting resin is a water-soluble, colourless transparent liquid having a solids content of 65% which is suitable for use in the production of fibreboard and particle board.

EXAMPLE 4

Aqueous formaldehyde solution (531.9 g; 55% HCHO) is mixed with aqueous sodium hydroxide solution (10% w/v NaOH) and urea (254.3 g), the amount of sodium hydroxide solution being sufficient to give a mixture of pH 9. The mixture, which has a F:U molar ratio of 2.3:1, is stirred and heated to reflux temperature, where it is maintained for 15 minutes. An aqueous solution of sulphuric acid (15% $H_2SO_4$) is added to reduce the pH to 2.8. The acidified mixture is heated under reflux for 15 minutes.

Whilst maintaining the reflux, aqueous sodium hydroxide solution (10% w/v NaOH) is added to give a solution of pH 8.5. This is allowed to cool to 40° C., urea (164 g) is added, giving a F:U molar ratio of 1.4:1, and the mixture is stirred for 30 minutes.

The resulting resin is a water-soluble, colourless transparent liquid having a solids content of 60% which is suitable for use as a binder in the production of fibreboard and particle board.

EXAMPLE 5

Aqueous formaldehyde solution (510.2 g; 60% HCHO) is mixed with aqueous sodium hydroxide (10% w/v NaOH) and urea (266.2 g, the amount of sodium hydroxide solution being sufficient to give a mixture of pH 8. The mixture, which has a F:U molar ratio of 2.3:1, is stirred and heated to reflux temperature, where it is maintained for 15 minutes. An aqueous solution of sulphuric acid (15% $H_2SO_4$) is added to reduce the pH to 2.9. The acidified mixture is heated under reflux for 10 minutes.

Whilst maintaining the reflux, aqueous sodium hydroxide solution (10% w/v NaOH) is added to give a neutral solution (pH 7). This is allowed to cool to 40° C., urea (205 g) is added, giving a F:U molar ratio of 1.3:1, and the mixture is stirred for 60 minutes.

The resulting resin is a water-soluble, colourless transparent liquid having a solids content of 65% which is suitable for use in the production of fibreboard and particleboard.

EXAMPLE 6

Aqueous formaldehyde solution (556.6 parts; 51% HCHO) is mixed with aqueous sodium hydroxide solution (10% w/v NaOH) and urea (230.3 parts), the amount of sodium hydroxide solution being sufficient to give a mixture of pH 9. The mixture, which has a F:U molar ratio of 2.38:1, is stirred and heated to reflux temperature, where it is maintained for 15 minutes. An aqueous solution of sulphuric acid (5.3 ml; 15% $H_2SO_4$) is added. The resulting mixture, which is of pH 2.5, is heated under reflux for 30 minutes.

Whilst maintaining the reflux, aqueous sodium hydroxide solution (10% w/v NaOH) is added to give a neutral solution (pH 7). This is allowed to cool to 40° C., urea (204.8 parts) is added and the mixture is stirred for 60 minutes.

The resulting resin is a water-soluble, colourless transparent liquid having a F:U molar ratio of 1.28:1, a solids content of 59%, a viscosity at 25° C. of 0.19 Pa s and a free formaldehyde content of less than 0.3%.

EXAMPLE 7

Softwood core chips (1530 g), dried to a moisture content of 2%, are blended with a mixture comprising the resin described in Example 6 (201 g), ammonium chloride solution (12 g; 15% $NH_4Cl$), a commercial wax emulsion (12.5 g; 65% wax) and water (47 g). Part of the resultant blend (1650 g) is placed within a wooden frame 355 mm square, and consolidated at room temperature under a pressure of 791 kPa. The resultant consolidated sheet is removed from the frame and compressed at 145° C. for 8 minutes under a pressure of 2.77 MPa. The resultant chipboard (particle board) has a thickness of 19 mm. The board is tested, with the following results:

Resin content of board (% solids): 8
Density (kg/$m^3$): 645
Modulus of rupture (mPa): 14.45
Transverse tensile strength (mPa): 0.56
Total extractable formaldehyde (%): 0.016.

It can be seen that the total extractable formaldehyde, measured in accordance with BS 1811, in the board is extremely low.

What is claimed is:

1. A process for the preparation of urea-formaldehyde resins which comprises
   (i) mixing an aqueous formaldehyde solution containing more than 50% by weight of formaldehyde with urea at a formaldehyde:urea molar ratio of 2 to 3:1 and at pH 6–11,
   (ii) heating the mixture to at least 80° C.,
   (iii) adding an acid until the mixture reaches a pH within the range 0.5–3.5,
   (iv) heating the mixture at a temperature between 80° C. and the reflux temperature,
   (v) with the mixture at a temperature of at least 80° C., adding a base until the mixture reaches a pH within the range 6.5–9, and
   (vi) adding urea to the mixture at a temperature up to 45° C. until the formaldehyde:urea molar ratio is within the range 0.8–1.8:1.

2. A process according to claim 1, in which the initial formaldehyde:urea molar ratio is within the range 2.2 to 2.8:1.

3. A process according to claim 2, in which the initial formaldehyde:urea molar ratio is within the range 2.3 to 2.5:1.

4. A process according to claim 1, in which the mixture produced in stage (i) has a pH of 8 to 9.

5. A process according to claim 1, in which the heating stage (ii) is effected to reflux temperature.

6. A process according to claim 1, in which acidification in stage (iii) is effected to pH 1 to 3.

7. A process according to claim 1, in which the heating in step (iv) is effected under reflux.

8. A process according to claim 1, in which the heating stage (iv) is effected for a period of from 15 minutes to 1 hour.

9. A process according to claim 1, in which addition of urea in stage (vi) gives a product having a formaldehyde:urea molar ratio within the range 1.0 to 1.7:1.

10. A process according to claim 9, in which the urea addition gives a product having a formaldehyde:urea molar ratio of 1.2 to 1.5:1.

11. A resin prepared by a process according to claim 1.

12. A resin according to claim 11 in cured form.

13. Bonded lignocellulosic material comprising as binder a cured resin according to claim 12.

14. A process for bonding two lignocellulosic surfaces together which comprises applying to at least one of the surfaces a resin according to claim 11 and holding the surfaces together while curing the resin.

15. A process according to claim 14, in which fibreboard or particleboard is produced by mixing lignocellulosic fibres or resin with a heat-activated hardener therefor, and heating the resulting mixture under pressure until the binder is cured.

16. A process for the preparation of a solid particulate urea-formaldehyde resin which comprises
   (i) mixing an aqueous formaldehyde solution containing more than 50% by weight of formaldehyde with urea at a formaldehyde:urea molar ration of 2 to 3:1 and at pH 6–11,
   (ii) heating the mixture to at least 80° C.,
   (iii) adding an acid until the mixture reaches a pH within the range 0.5–3.5,
   (iv) heating the mixture at a temperature between 80° C. and the reflux temperature,
   (v) with the mixture at a temperature of at least 80° C., adding a base until the mixture reaches a pH within the range 6.5–9,
   (b) reacting the mixture from step (v) with urea at a pH below 7 to increase the viscosity thereof,
   (c) adding a base until the mixture reaches a pH within the range 6.5–9, and
   (d) dehydrating the mixture to form a solid particulate resin.

17. A process according to claim 16, in which step (b) is carried out at a pH of 3 to 5 and a temperature of 30° to 60° C., using urea in an amount sufficient to give the reaction mixture a formaldehyde:urea molar ratio of from 1.3:1 to 1.9:1, until the viscosity of the reaction mixture is 2 to 4 times the initial vicosity thereof.

18. A process according to claim 17, in which step (b) is carried out at a pH of 3.5 to 4.5 and a temperature of 35° to 50° C., using urea in an amount sufficient to give the reaction mixture a formaldehyde:urea molar ratio of from 1.5:1 to 1.7:1, until the viscosity of the reaction mixture is 2.5 to 3.5 times the initial viscosity thereof.

19. A process according to claim 16, in which the mixture reacted with urea has a solids content of from 40 to 55% by weight.

20. A binder comprising a solid particulate resin obtained by a process according to claim 16, either as a solid together with a solid hardener therefor or dissolved or dispersed in water, the solution or dispersion being mixed with a hardener for the resin.

* * * * *

UNITED STATES PATENT AND TRADEMARK OFFICE
CERTIFICATE OF CORRECTION

PATENT NO. : 4,968,773

DATED : November 6, 1990

INVENTOR(S) : IAN ROBERT WHITESIDE

It is certified that error appears in the above-identified patent and that said Letters Patent is hereby corrected as shown below:

On the cover page of the patent, the left hand column, in the section titled "(*) Notice:", the date "May 8, 2090" should be corrected to read --Nov. 6, 2007--.

Signed and Sealed this

Fifth Day of January, 1993

Attest:

DOUGLAS B. COMER

Attesting Officer

Acting Commissioner of Patents and Trademarks